United States Patent [19]

Krall et al.

[11] 4,122,141

[45] Oct. 24, 1978

[54] METHOD FOR FORMING ARTICLES FROM THERMOPLASTIC MATERIAL

[75] Inventors: Thomas J. Krall; Albert R. Uhlig, both of Toledo, Ohio

[73] Assignee: Owens-Illinois, Inc., Toledo, Ohio

[21] Appl. No.: 809,509

[22] Filed: Jun. 23, 1977

[51] Int. Cl.² ............................................. B29C 17/07
[52] U.S. Cl. ...................................... 264/89; 264/98; 425/530; 425/534
[58] Field of Search ....................... 264/89, 90, 92, 94, 264/96–99, 296; 425/530, 532, 534, 540

[56] References Cited

U.S. PATENT DOCUMENTS

| | | | |
|---|---|---|---|
| 3,583,031 | 6/1971 | Kader et al. | 425/534 X |
| 3,596,315 | 8/1971 | Yoshikawa et al. | 425/540 X |
| 3,754,851 | 8/1973 | Reilly et al. | 264/98 X |
| 3,872,203 | 3/1975 | Yoshikawa et al. | 425/530 X |
| 3,970,419 | 7/1976 | Yalyi | 264/94 X |
| 3,978,184 | 8/1976 | Dybala et al. | 264/89 |

*Primary Examiner*—Jan H. Silbaugh
*Attorney, Agent, or Firm*—Steve M. McLary; Myron E. Click; David H. Wilson

[57] ABSTRACT

A method for the manufacture of plastic containers. In a first embodiment of the invention a tubular length of thermoplastic material is severed from an extruder and blown into a preform shape in a movable preform mold. After completion of the cycle, the preform mold opens and returns to the extruder for a new section of material. The preform shape remains in the location where it was formed. Return of the preform mold moves the previously completed preform shape into registry with a conditioning mold. At this location, it is grasped by an indexable neck clamp. After completion of the thermal conditioning provided by the conditioning mold, the preform shape is indexed to a final shape mold where it is given its final configuration. The completed container is then indexed to a removal station for ejection from the forming process. In another embodiment of the invention, the preform shape is not retained at the preform mold station while a new length of material is obtained by the preform mold, but rather is indexed to the conditioning mold station during the time the preform mold is moving to and from the extruder to obtain a new length of material.

11 Claims, 24 Drawing Figures

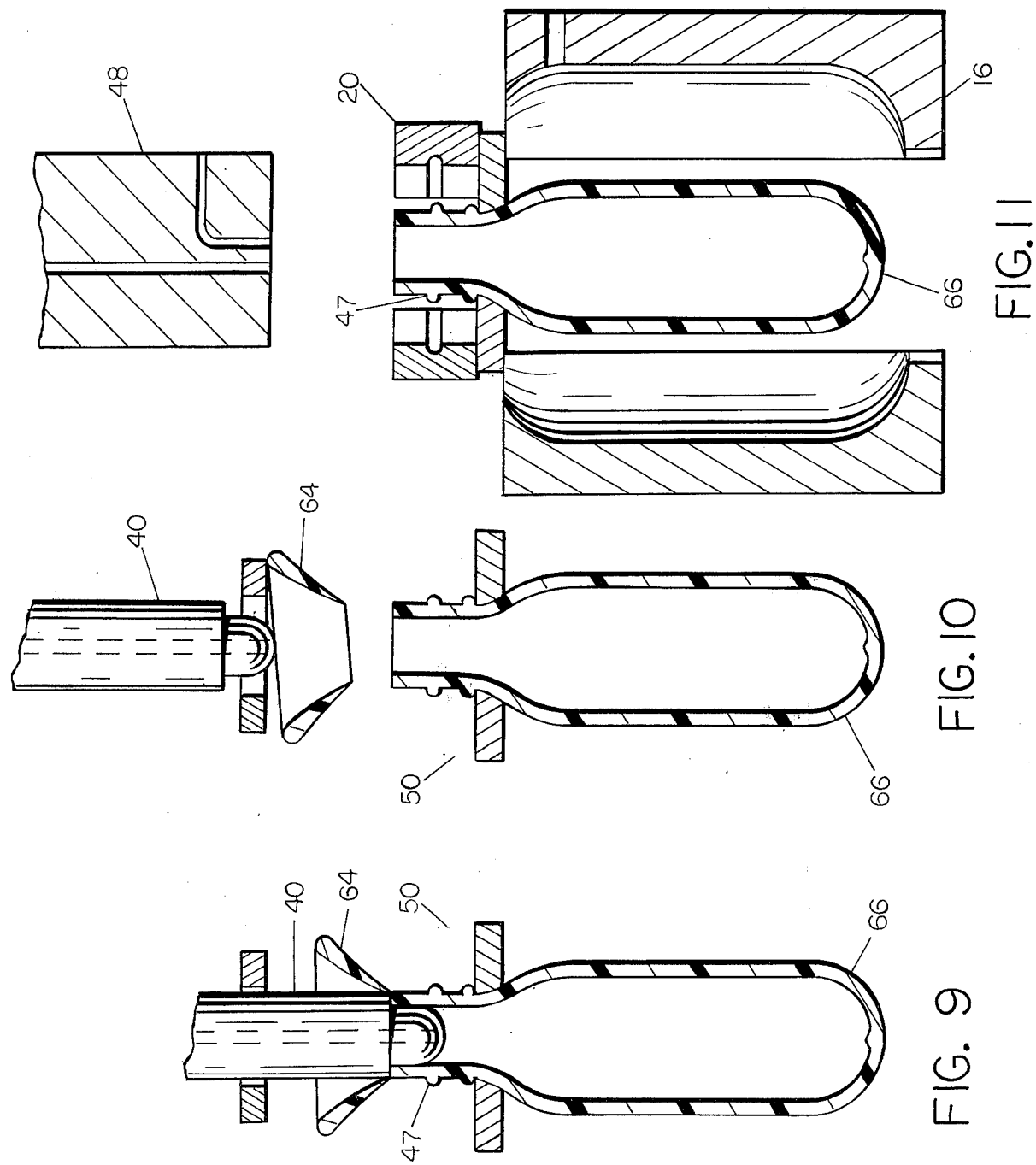

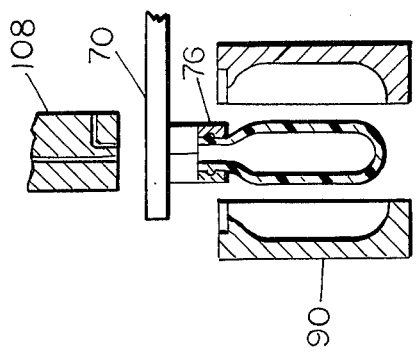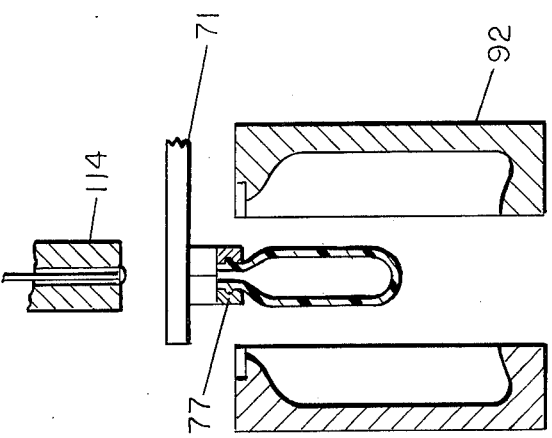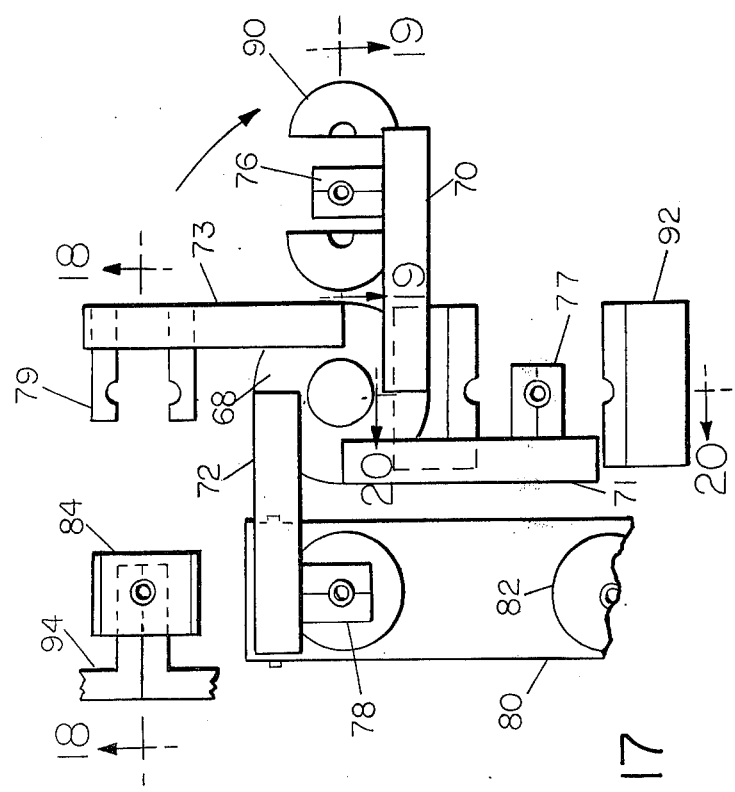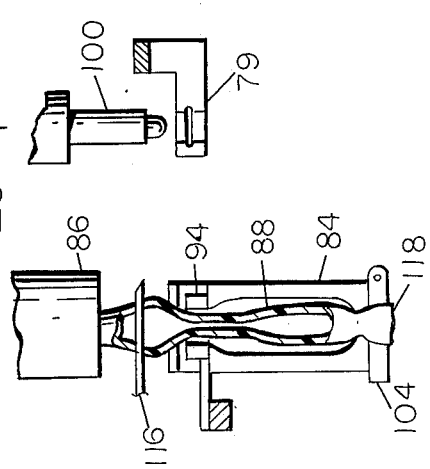

METHOD FOR FORMING ARTICLES FROM THERMOPLASTIC MATERIAL

BACKGROUND OF THE INVENTION

This invention generally relates to a method for forming containers from a thermoplastic material. More particularly, this invention is concerned with a plastic bottle forming method which uses a neck holding device to transfer the bottle from station to station in a multi-step forming process, particularly in the final blowing of a biaxially oriented article.

The use of more than one station in the forming of plastic bottles is known in the art. It is always desired to improve the forming process whenever possible. One area where improvement is desired is in the formation of the finish portion. Examples of prior art processes may be seen in U.S. Pat. No. 3,767,747, now U.S. Pat. No. Re. 29,065, and U.S. Pat. No. 3,978,184 as well as the article "Stretch Blow Molding PVC and Nitriles," *Modern Plastics,* pp 32–86, September, 1976, the teachings of all of which are hereby incorporated by reference. Yet another prior art system may be seen in U.S. Pat. No. 4,004,872. We have developed a process that uses neckrings or neck clamps to transfer a plastic container through various stages of formation as opposed to using a mold or blow pin as taught by the prior art, thus achieving better accuracy in finish formation.

SUMMARY OF THE INVENTION

This invention is a process or method for the manufacture of hollow articles. In one aspect of the invention, a tubular length of a thermoplastic material is extruded. An open preform mold is moved from a first location remote from the length of material to a second location surrounding the length of material and is closed about the material. The upper portion of the length of material is grasped by a tube retainer which moves with the preform mold. At the same time, a portion of the tubular length of material, intermediate the preform mold and the tube retainer, is pressed into a generally uniform cylindrical portion by closing a support ring which is fixed at the second location. The tubular length of material is severed, the support ring is opened, and the preform mold and tube retainer are moved back to the first location. At the first location, a neckring is closed around the pressed, uniform cylindrical portion and the material is conformed to the interior contours of the neckring and the preform mold to define a preform shape. The preform mold and tube retainers are then opened, while keeping the neckring closed, and the preform shape is indexed to an open conditioning mold which is then closed. The preform shape is thermally conditioned in the conditioning mold. After this, the conditioning mold is opened and the preform shape indexed to an open final shape mold. This mold is closed and the preform shape is conformed to the interior contours of the final shape mold to thereby define a finished article. This finished article is then indexed to a location over a removal conveyor and the neckring opened to release the finished article and allow its removal.

BRIEF DESCRIPTION OF THE DRAWINGS

FIG. 9 is a side elevation view, in cross-section, on an enlarged scale illustrating suspension of the preform shape from the blow pin and finish holder;

FIG. 10 is a side elevation view, in cross-section, on an enlarged scale illustrating removal of the blow pin end suspension of the preform shape from the finish holder alone;

FIG. 11 is a side elevation view, in cross-section, on an enlarged scale illustrating transfer of the preform shape to the conditioning mold;

FIG. 17 is a view similar to FIG. 12 illustrating an intermediate point during an index cycle;

FIG. 18 is a side elevation view, partially in cross-section, taken generally along the line 18—18 of FIG. 17;

FIG. 19 is a side elevation view in cross-section taken generally along the line 19—19 of FIG. 17;

FIG. 20 is a side elevation view in cross-section taken generally along the line 20—20 of FIG. 17;

DETAILED DESCRIPTION OF THE DRAWINGS

Figure 1:
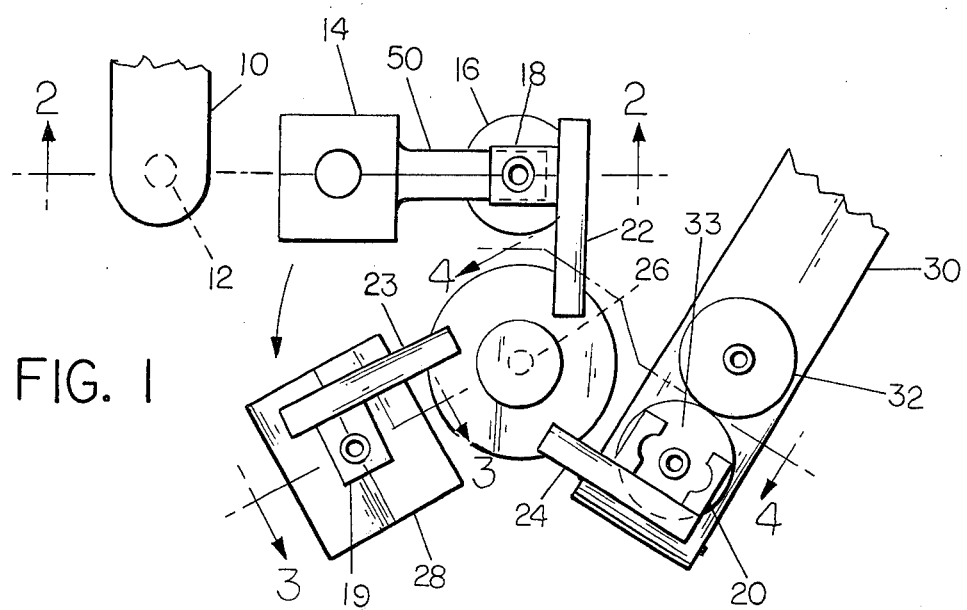
FIG. 1 is a top, plan view, in a schematic form, of an apparatus for carrying out the present method.

In FIG. 1, the apparatus is shown in the configuration which would be assumed at the beginning of a forming cycle. The thermoplastic material which is to be formed into a container is furnished by an extruder 10 from which issues a pendent tube 12, which is hidden in FIG. 1. A severed section of the pendent tube 12 is contained within a preform mold 14 in which the severed section of tube is formed into a preform shape. After formation into a preform shape, the preform shape is held within a conditioning mold 16 which is fixed in position and located in the path of travel of series of finish clamps 18, 19 and 20, which may be opened and closed, that are carried by extending arms 22, 23 and 24. The arms 22, 23 and 24 are firmly attached to an indexing rotary turret type mechanism 26. The turret mechanism 26 indexes the arms 22, 23 and 24 in synchronism with the desired machine cycle. In addition to the preform mold 14, and conditioning mold 16, there is also provided a final blow mold 28, likewise in the path of the finish clamps 18 through 20. A final position in the path of travel of the finish clamps 18-20 is an endless, moving removal conveyor 30 upon which finished plastic containers such as those designated as 32 and 33 are deposited for delivery to a storage area. The finish clamps 18 and 19 are shown as being closed in FIG. 1. This is so since the molds themselves with which these particular clamps are associated at this time, namely the conditioning mold 16 and final blow mold 28, are also closed for forming of the plastic container. However, the finish clamp 20 has been opened over the removal conveyor 30 to allow transport of the finished plastic container 33 away from the finish clamp 20. This then will allow the finish clamp 20 to be ready to move into position over the conditioning mold 16 on the next index of the machine cycle.

Figure 2:
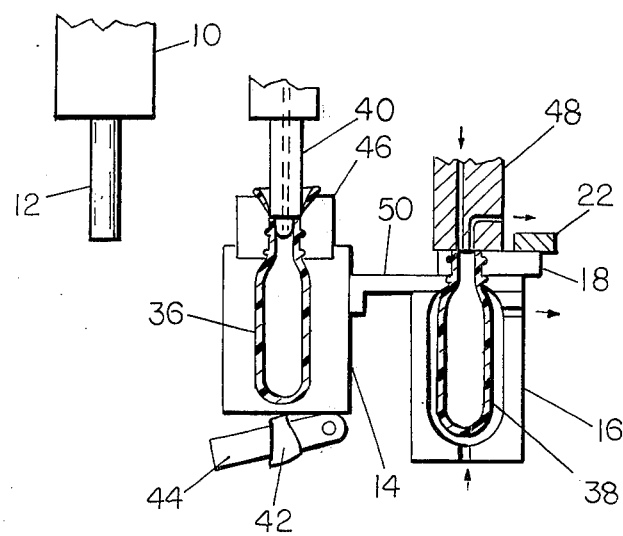
FIG. 2 is a side elevation view in cross-section taken generally along the line 2—2 of FIG. 1.

The view of FIG. 2 allows a somewhat different look at the apparatus of FIG. 1 in the configuration shown therein. Observe that the preform mold 14 contains a nearly completed preform shape 36. The conditioning mold 16 contains a completed preform shape 38. In the process of forming the preform shape 36, air is introduced into the interior of the pendent tube which was severed to allow formation of the preform shape 36 through a hollow core pin 40. Closing of the preform mold 14 sealed the bottom portion of the pendent tube which has been removed. In so doing, a waste or tail portion 42 was formed. This portion is removed by a conventional tail remover 44 at this stage of the process. In addition, insertion of the core pin 40 helps form the uppermost or finish portion of the preform shape 36. This is done in part by forcing the thermoplastic material into the threaded grooves of neckring 46 which lies above the main body portion of the preform mold 14. Both the neckring 46 and the preform mold 14 are, of course, of the openable type which allows transfer and removal of any preform shape, such as that designated as 36, which is formed therein. The completed preform shape 38 contained within the conditioning mold 16 is subjected to a flow of gas or air from a conditioning air baffle 48 which covers the open mouth portion of the preform shape 38. A finish holder 50 is actually attached to the preform mold 14 and opens and closes to allow carrying or transporting of a completed preform shape such as 38 to the location of the conditioning mold 16. The finish holder 50 actually supports the preform shape 38 under the finish portion of the preform shape. See U.S. Pat. No. 3,978,184 for a complete description of this operation. At the location of the conditioning mold 16, one of the several finish clamps will rotate into position and clamp the finish portion of the preform shape above the actual finish holder 50. In this case, it is the finish clamp 18 which has fastened itself upon the finish portion of the preform shape 38.

Figure 3:
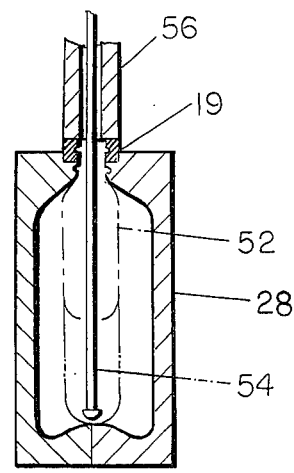
FIG. 3 is a side elevation view in cross-section taken along the line 3—3 of FIG. 1.

As illustrated in FIG. 3, in the final blow mold 28, a preform shape 52 is partially stretched into its final shape by a plunger 54 and hereafter blown into conformity with the interior contours of the final blow mold 28. The dotted line portion shown in FIG. 3 illustrates that the preform shape 52 is stretched downwardly by the plunger 54 to a position adjacent the bottom of the interior cavity of the blow mold 28. The final blow air may be introduced through a blow head 56 through which the plunger 54 passes. If desired or desirable, the plunger 54 may be omitted and only air used to complete the plastic container from the preform shape 52. In this case, the preform shape 52 is carried by the finish clamp 19 supported from the arm 23.

Figure 4:
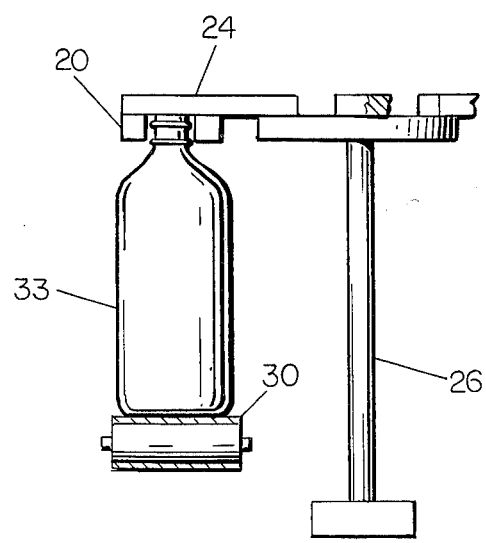
FIG. 4 is a side elevation view in cross-section taken generally along the line 4—4 of FIG. 1.

FIG. 4 shows the release of the finished container 33 onto the removal conveyor 30. As previously noted, the finish clamp 20 is open at this position to allow deposit of the finished container 33 onto the removal conveyor 30. The finish clamp 20 is carried by the arm 24 attached to the turret mechanism 26.

Figure 5:
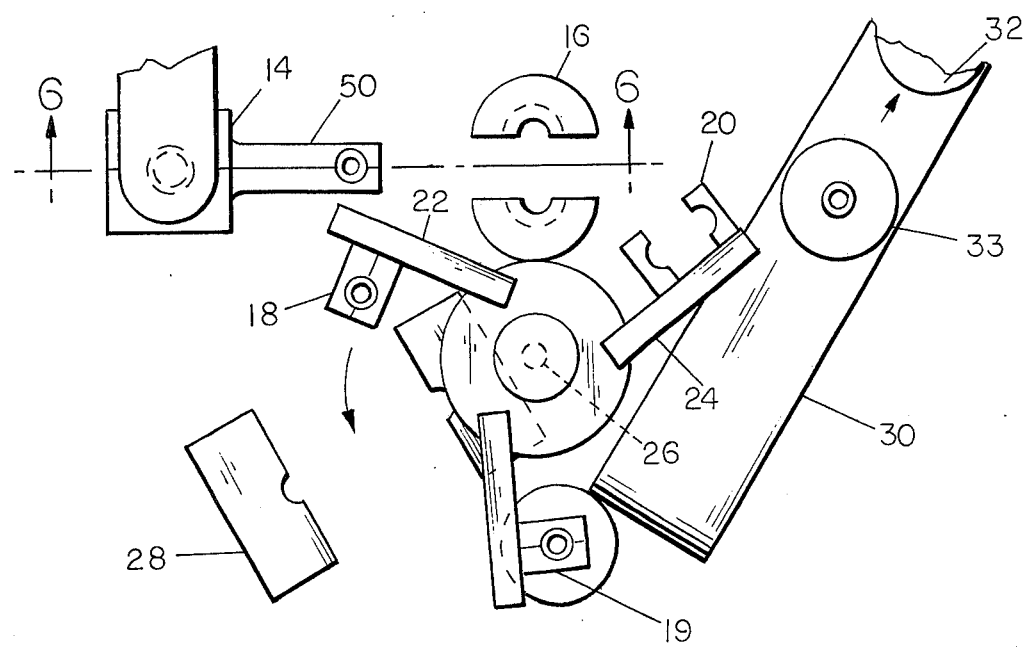
FIG. 5 is a view similar to FIG. 1 illustrating an intermediate point during an index cycle.

FIG. 5 illustrates the apparatus of FIG. 1 just after the completion of one cycle and during the indexing cycle of the turret mechanism 26. In this configuration, the preform mold 14 has moved over into proximity of the pendent tube 12 and has closed around it. Before this movement occurred, the preform mold 14 had opened and allowed the preform shape 36, in its now completed configuration, to be suspended from the core pin 40. The conditioning mold 16 opens and the completed preform shape 38 which was contained therein is shown as being transferred toward the final blow mold 28 which has also opened. Opening of the final blow mold 28 allowed removal of a completed container therefrom and its transport toward the removal conveyor 30 where it will be released by the finish clamps 19 carrying it to allow its removal. The finish clamps 20, which were previously positioned over the removal conveyor 30, are rotated toward alignment with the conditioning mold 16 where they will grasp the preform 36 now suspended from the core pin 40 after it has been released from the core pin 40 to be held by the finish holder 50. This will occur after the preform mold 14 has retracted back to its position shown in FIG. 1.

Figure 6:
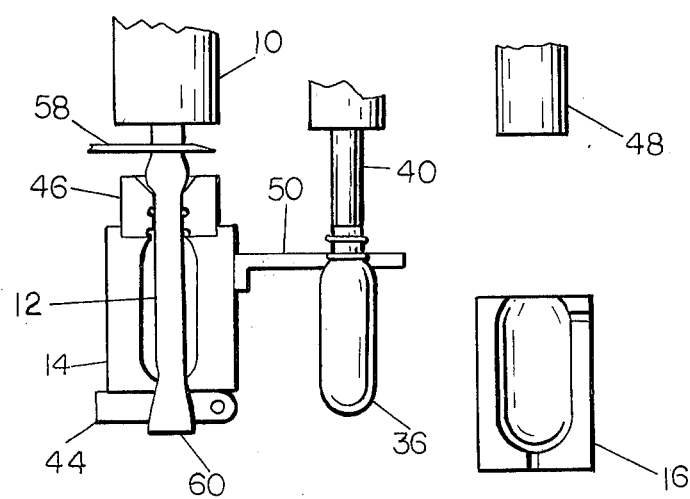
FIG. 6 is a side elevation view, partially in cross-section, taken generally along the line 6—6 of FIG. 5.

As most clearly illustrated in FIG. 6, the pendent tube 12 which has been allowed to freely form from the extruder 10 is severed by a knife mechanism 58 which allows it to now be contained within the preform mold 14. Closing of the preform mold 14 about the pendent tube 12 has created formation of a tail portion 60 which will later be removed by the tail puller 44 as has been previously noted. The preform shape 36 is now shown as being generally gripped by the finish holder 50. The core pin 40 is still in position but will be removed before the preform mold 14 moves back to its position of FIGS. 1 and 2 for the cycle to resume. This movement occurs after the turret 26 has completed its index cycle and has placed all the finish clamps 18, 19 and 20 over one of the three stations about its periphery. From the foregoing description it should be quite clear that there are in fact three separate stations about the periphery of the turret mechanism 26 to which the finish clamps 18, 19 and 20 are rotated. One station is the location of the conditioning mold 16, a second is the location of the blow mold 28 and a third is a location over the removal conveyor 30.

Figure 7:
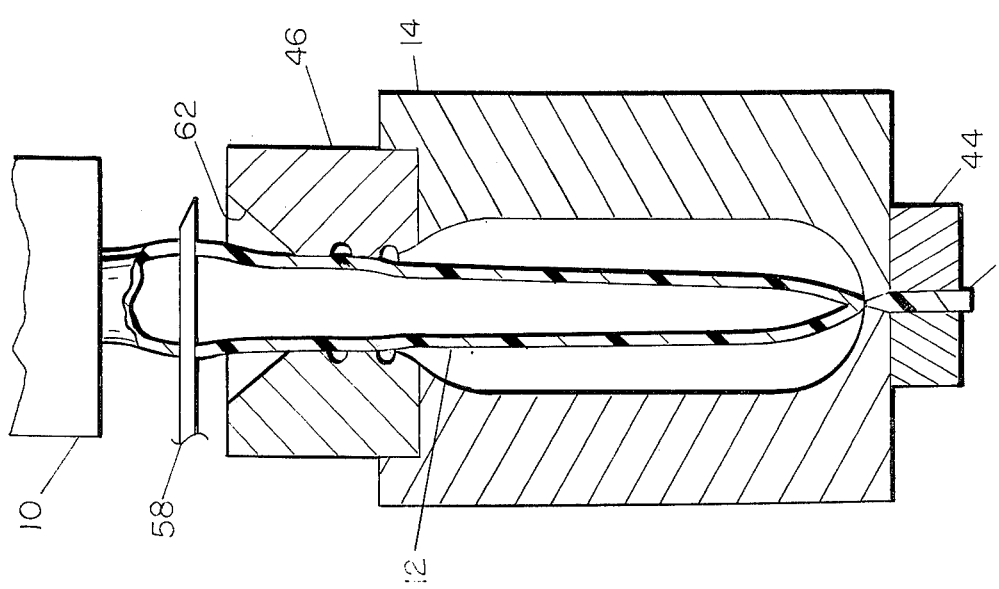
FIG. 7 is a side elevation view in cross-section, on an enlarged scale illustrating the severing of a pendent tubular length of material and its enclosure by the preform mold.

FIGS. 7 through 11 illustrate, on an enlarged scale, the operations performed at selected stations within the total forming cycle to better illustrate the actions preformed upon the container during the forming cycle. In FIG. 7, the severing of the pendent tube 12 by the knife mechanism 58 is shown on a larger scale to clarify the action which occurs at this point. Observe that the neck ring 46 includes a tapered recess portion 62 near an opening into its upper surface. For ease of explanation, it will be assumed that the pendent tube 12 will be processed through the following steps in FIGS. 8, 9, 10 and 11, although the entire cycle illustrated heretofore has not followed one single tube through the cycle to this extent.

Figure 8:
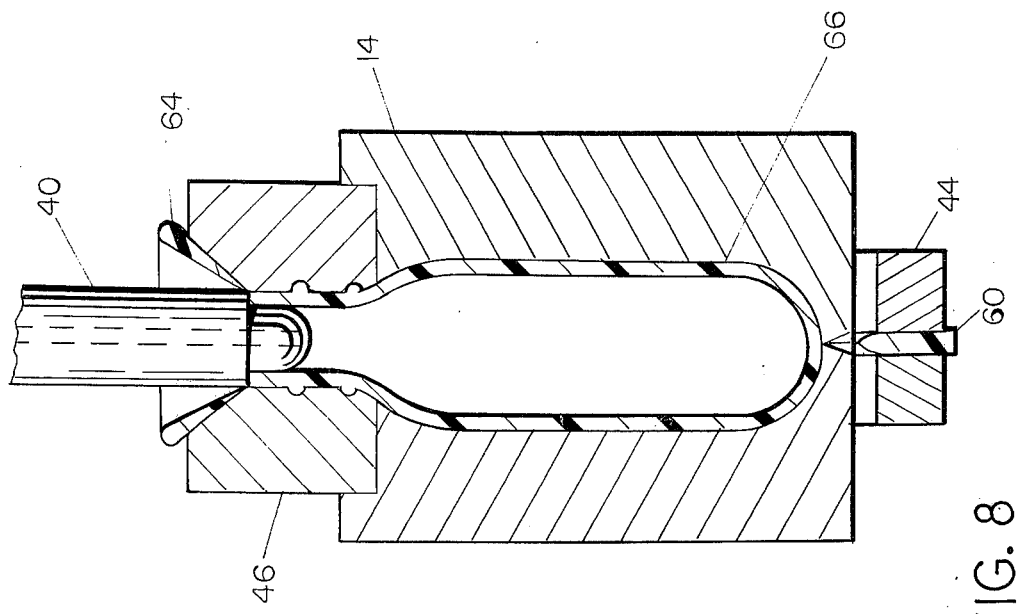
FIG. 8 is a side elevation view, in cross-section, on an enlarged scale illustrating formation of the preform shape.

As seen in FIG. 8, the core pin 40 has entered the severed pendent tube 12. In so doing, it has displaced an upper moil portion 64 into the tapered recess 62 and cut this off by bottoming on the tapered recess 62. In addition, the entry of the core pin 40 has pressed material into the threads formed in the neck ring 46 which define the finish portion of the container. In addition, air has been introduced through the core pin 40 to allow the tube 12 to be blown out into conformity with inner contours of the preform mold 14 to form yet another preform shape designated as 66. The tail pulling mechanism or remover 44 has also been actuated at this point to remove the tail portion 60.

In FIG. 9, the preform mold 14 has opened, as has the neck ring 46, and moved to a position surrounding a new extruded pendent tube as shown in FIG. 5. At this time, the preform shape 66 is left suspended from the core pin 40 as previously noted. Additionally, the finish holder 50 has been positioned around the lower portion of the finish of the preform shape 66, but is still open at this time.

In FIG. 10, the finish holder 50 has closed to support the preform shape 66 and the core pin 40 has retracted, pulling with it the moil portion 64 which is then discarded.

FIG. 11 shows the preform shape 66 now held by the finish holder 50 over the open conditioning mold 16. It may also be seen that the finish clamp 20 is also open and ready to be closed about the finish portion to hold it for further movement through the entire forming cycle. Additionally, the conditioning air baffle 48 is ready to be lowered into position after the conditioning mold 16 and the finish clamp 20 have been closed.

Figure 12:
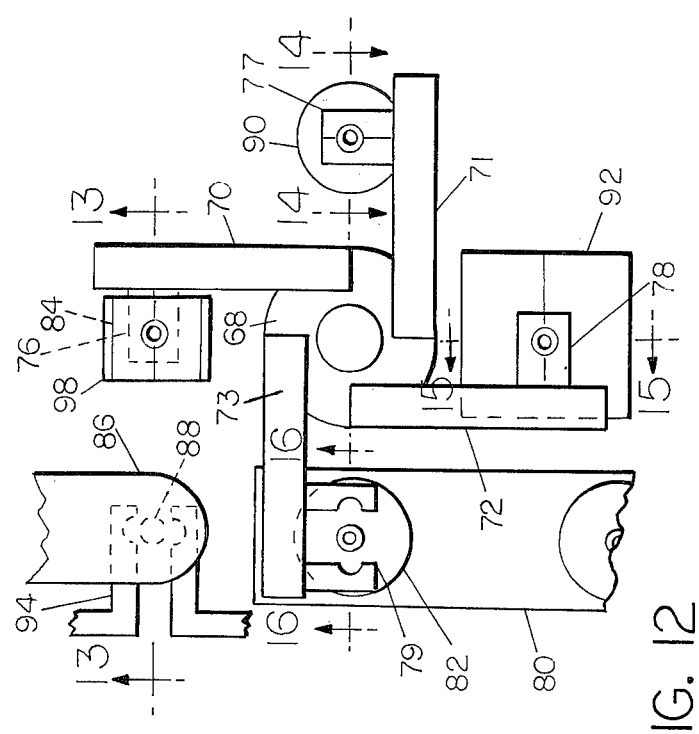
FIG. 12 is a top, plan view, in a schematic form, of an apparatus for carrying out another aspect of the present method.

FIGS. 12 through 24 illustrate another embodiment of the present invention involving a somewhat different method of transfer and holding of the preform shape. Additionally, the embodiment of FIGS. 12 through 24 utilizes a total of four operational stations about the periphery of a rotatable mechanism as opposed to the three stations illustrated in the embodiment of FIGS. 1 through 11. With particular reference now to FIG. 12, a rotary turret mechanism 68 carries abouts its periphery four extending arms 70, 71, 72 and 73. Each of these arms carries an individual neck ring which may be opened and closed, the neck rings being respectively designated as 76 through 79. The neck ring 79, carried by the arm 73, is shown as being positioned over a removal conveyor 80 on which a completed plastic container 82 has just been deposited. The neck ring 76 is positioned in registry with a movable preform mold 84. The preform mold 84 is movable from a position under an extruder 86 which forms pendent tubular shapes 88 to the position shown in FIG. 12. The neck ring 77 is located over a closed conditioning mold 90 and the neck ring 78 is positioned over a closed final blow mold 92. The configuration of the machine shown in FIG. 12 is at a time in the machine cycle when all of the operations upon the thermoplastic material are being performed toward the goal of making a finished product. Positioned in proximity to the pendent tube 88 is a support ring 94 which may be opened and closed to surround a pendent tube which is extruded from the extruder 86.

Figure 13:
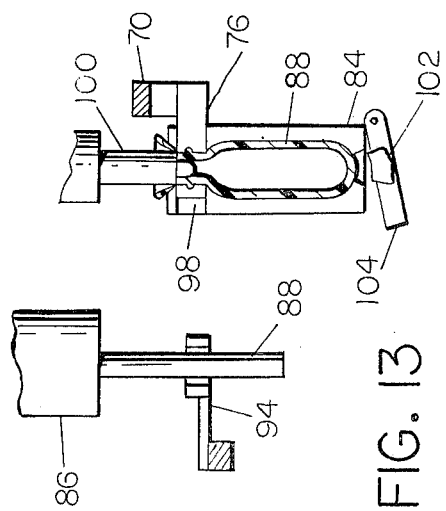
FIG. 13 is a side elevation view in cross-section taken generally along the line 13—13 of FIG. 12.

As illustrated in FIG. 13, at the time in the machine cycle illustrated in FIG. 12, the pendent tube that had been surrounded by the preform mold 84 has been blown into conforming shape with the interior cavity of the preform mold 84. Located adjacent to the preform mold 84 is the neck ring 76 having interior contours which define the final shape of the finish of a container made by this process. A tube retainer 98 generally surrounds the neck ring 76. The neck ring 76 and tube retainer 98 are both capable of being opened to allow removal of a finished preform shape and pickup of a pendent tube. As was the case in the embodiment previously described, a core pin 100 is used to press the yielding thermoplastic material into conformity with the interior threads of the neck ring 76 and is also used to introduce air into the interior of the tubular member to allow blowing it into conformity with the contours of the interior of the preform mold 84. A tail portion 102 of the pendent tube contained within the preform mold 84 is being removed by a tail removal mechanism 104.

Figure 14:
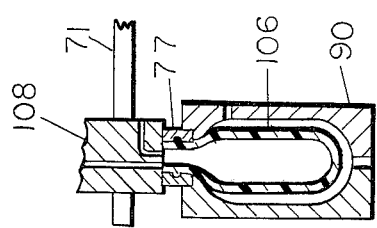
FIG. 14 is a side elevation view in cross-section taken generally along the line 14—14 of FIG. 12.

A completed preform shape 106, as seen in FIG. 14, is contained within the conditioning mold 90 and is subjected to a flow of gas or air from a conditioning air baffle 108 which covers the open mouth portion of the preform 106. At this point in the process it is quite evident that the preform shape 106 is suspended from and carried by the neck ring 77 which in turn is supported from the arm 71. The conditioning air baffle 108 is allowed to come down in such a manner as to make contact with the open mouth portion of the preform 106.

Figure 15:
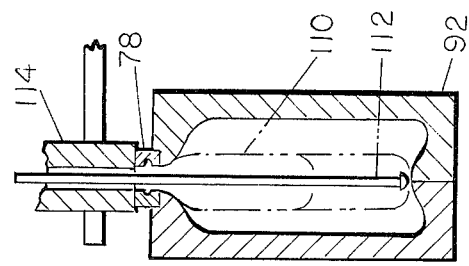
FIG. 15 is a side elevation view in cross-section taken generally along the line 15—15 of FIG. 12.

FIG. 15 illustrates the placement of a conditioned preform shape 110 into the final blow mold 92 for completion into a finished plastic container. As was the case with the embodiment previously described, the preform shape 110 is partially stretched into its final shape by a plunger 112, with the dotted line portion in FIG. 15 showing the downward stretching of the preform shape 110 by extension of the plunger 112 to the bottom of the cavity of the final blow mold 92. The preform 110 after stretching may then be blown into conformity with the interior cavity of the blow mold 92 to complete the container. Blow air may be introduced through a blow head 114 through which the plunger 112 passes. As was the previously discussed case, the plunger 112 may be eliminated and the container formed only by final air pressure. However, stretching by use of the plunger 112 is the preferred method of operation. The preform shape 110 in this case is carried by the neck ring 78 supported by the arm 72.

Figure 16:
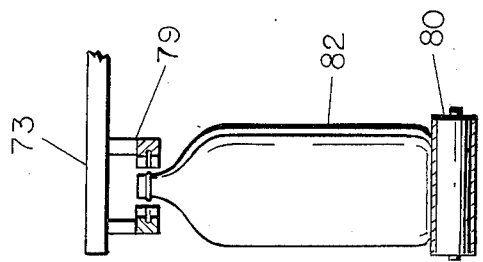
FIG. 16 is a side elevation view in cross-section taken generally along the line 16—16 of FIG. 12.

FIG. 16 illustrates the release of the finished container 82 onto the removal conveyor 80. In this position, the neck ring 79 has been opened to allow release of the container 82 onto the removal conveyor 80.

In FIG. 17, the apparatus of FIG. 12 is shown just after the completion of one cycle and during the indexing cycle of the turret mechanism 68. The turret mechanism 68 may be basically identical to the turret mechanism previously described with reference to FIG. 1 in that it is timed to cycle in a specific, stepped sequence. That is, the turret mechanism 68 will index containers from one position to another fixed position in a series of steps. These positions basically correspond with those seen in FIG. 12. These are the stations in which the preform mold 84 is closed, the conditioning mold 90 is closed, the final blow mold 92 is closed and the removal station where the neck ring opens to allow the finished plastic container to be deposited on the removal conveyor 80. In FIG. 17, the preform mold 84 has been shuttled under the extruder 86 in order to clamp a new pendent tube for formation into a preform shape. Additionally, the support ring 94 has been closed to allow transfer of the pendent tube along with the preform mold 84 away from the orifice of the extruder 86. In the configuration shown in FIG. 17, the conditioning mold 90 is open, the final blow mold 92 is open and the neck rings 76, 77 and 78 are closed to allow transfer of plastic containers which they are carrying from previous station to the next station. Observe that the neck ring 79 remains open, ready to receive the newly severed pendent tube which will be shuttled by the moving preform mold 84 into registry with the neck ring 79. Only then will the neckring 79 be closed to allow formation of the finish of the plastic container and to provide a transport means for the remainder of the cycle.

In FIG. 18 the pendent tube 88 has been completely enclosed by the preform mold 84 which has closed upon it. The upper portion of the tube 88 has been severed from the extruder 86 by a knife mechanism 116. The closing of the bottom portion of the preform mold 84 has caused the formation of a waste or tail portion 118 which will later be removed by the tail puller 104. Also in this configuration, the support ring 94 as well as the tube retainer 98 are both closed to allow support of the severed tube 88 for transport to the open neck rings 79 which will then grasp it and hold for further transport through the entire cycle. At this time in this particular embodiment, the core pin 100 is empty of any container and is in position over the location to which the preform mold 84 will be later moved. This is in contrast to the previously described embodiment in which a preform shape remained hanging on the core pin during the time the preform mold shuttled to obtain a new tube for forming purposes.

FIGS. 19 and 20 illustrate the movement of a conditioned preform shape and a preform shape into the conditioning mold 90 and the final blow mold 92. At this time in the cycle both the conditioning air baffle 108 and the blow head 114 are retracted out of the path of movement to allow transport of these partially formed containers into their respective molds for operation during the next period of the cycle.

Figure 21:
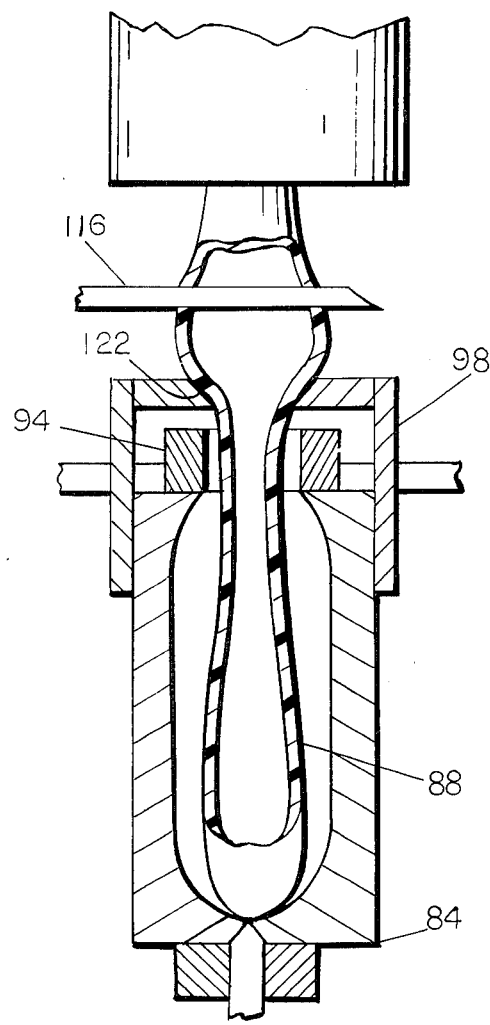
FIG. 21 is a side elevation view, in cross-section, on an enlarged scale illustrating the severing of a pendent length of material and its enclosure by a preform mold and grasping by a support ring and a tube retainer.
Figure 22:
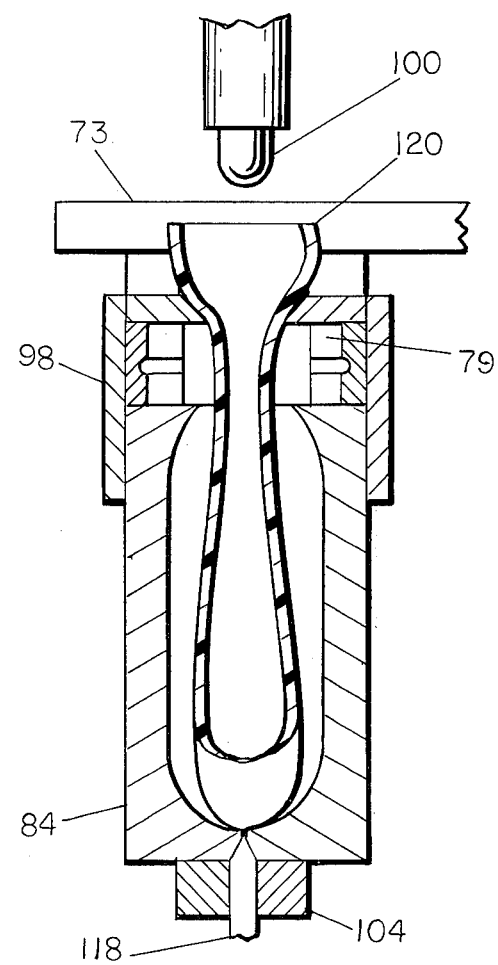
FIG. 22 is a side elevation view, in cross-section, on an enlarged scale illustrating the beginning of the formation of a preform shape.

FIGS. 21 through 24 illustrate, on an enlarged scale, some of the operations performed at selected stations within the total forming cycle. These figures are presented to better illustrate the actions performed during the actual formation process. In particular, these figures concentrate on the action taking place at the tube severing and preform shape molding stations. In FIG. 21, the action of the support ring 94 is perhaps more clearly seen. The support ring 94 actually forms a generally uniform cylindrical section on the tube 88 which allows stabilization of the tube 88 during its transfer and additionally provides an area in which the neck ring 79 may readily be clamped to allow precise formation of the finish portion of the container. It should be clear from FIG. 21 that the support ring 94 actually occupies the same space as and is generally the same shape as the neck ring 79 itself. However, this is quite distinct from the function performed in the embodiment first described in that the finish portion is not actually formed by the support ring 94 at this time. In FIG. 22, it may be seen that the severing of the tube 88 has allowed formation of an upper moil portion 120 which must be removed as waste. Additionally, the upper portion of the tube retainer 98 includes a tapered portion 122 very similar to the tapered portion 62 of the neck ring 46 in the embodiment first described. This tapered portion 122 is designed to serve the same function as that previously described. In FIG. 22 the support ring 94 has opened and allowed transport of the preform mold 84 and the tube retainer 98 into general registry with the neck ring 79, although the neck ring 79 has not been closed. Also in FIG. 22, the core pin 100 is still in a retracted position.

Figure 23:
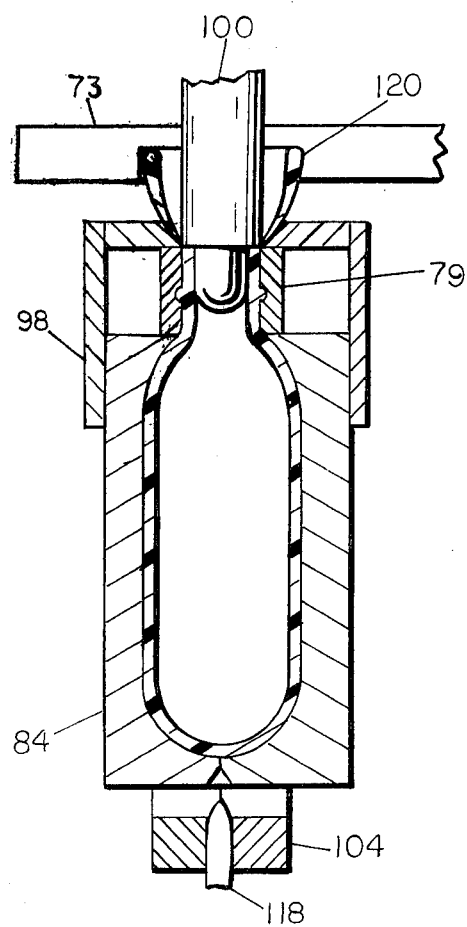
FIG. 23 is a side elevation view, in cross-section, on an enlarged scale illustrating formation of a preform shape including the finish portion.
Figure 24:
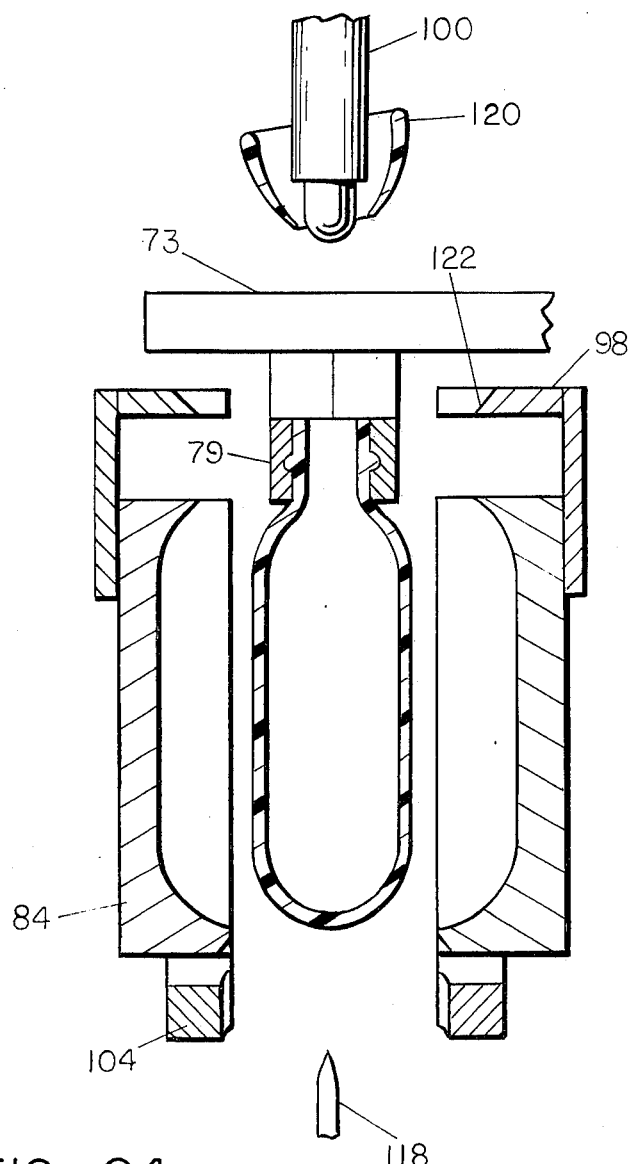
FIG. 24 is a side elevation view, in cross-section, on an enlarged scale illustrating opening of the preform mold and tube retainer and removal of the core pin.

In FIG. 23, the core pin 100 has been pressed downward to engage the tube 88 and the neck ring 79 has been closed around the straight portion previously formed by the support ring 94. This action, as has been previously explained, forces the thermoplastic material into the threads formed in the neck ring 79 thereby completing the finish portion of the container. The bottoming of the core pin 100 on the tapered portion 122 of the tube retainer 98 severs the moil portion 120 and allows its removal. FIG. 24 then illustrates that at the time the now finished preform shape is to be transferred to the conditioning mold 90, the tube retainer 98 opens to allow removal to this position. Also at this time the core pin 100 retracts, carrying with it the removed moil portion to be discarded. It is also to be noted that during this time period the tail portion 118 has been removed by the tail puller 104 and is also discarded. However, the neck ring 79 remains closed and supports the preformed shape from it to allow transfer into the conditioning mold 90.

What we claim is:

1. A process for the manufacture of hollow articles which comprises the steps of:
   extruding a tubular length of a thermoplastic material;
   moving an open preform mold from a first location remote from said tubular length of material to a second location surrounding said tubular length of material;
   closing said preform mold around said tubular length of material;
   severing said tubular length of material;
   moving said preform mold containing said severed tubular length of thermoplastic material to said first location for said preform mold;
   conforming said tubular length of thermoplastic material to the interior contours of said preform mold to thereby define a preform shape;
   opening said preform mold;
   moving said preform mold to said second location from said first location to obtain another tubular length of thermoplastic material;
   retaining said preform shape at said second location during said movement of said preform mold;
   grasping said preform shape with a finish holder at said second location;
   transferring said preform shape to an open conditioning mold;
   closing said conditioning mold around said preform shape;
   grasping said preform shape with a finish clamp;
   thermally conditioning said preform shape in said conditioning mold;
   opening said conditioning mold;
   releasing said preform shape from said finish holder;

indexing said preform shape carried by said finish clamp to an open final shape mold;

closing said final shape mold;

conforming said preform shape to the interior contours of said final shape mold to define a finished article;

opening said final shape mold;

indexing said finished article to a location over a moving, removal conveyor; and releasing said finished article from said finish clamp to allow its removal by said conveyor.

2. The method of claim 1 wherein the step of conforming said preform shape to the interior contours of said final shape mold includes the steps of:

mechanically stretching said preform shape to thereby elongate its vertical dimension; and blowing said stretched preform shape into contact with the interior contours of said final shape mold by introduction of a gas under pressure into the interior of said stretched preform shape.

3. The method of claim 1 wherein said articles are plastic containers having an exterior, threaded finish portion and which further includes the steps of:

simultaneously with the closing of said preform mold, closing a neck ring about the upper most portion of said tubular length of material, said neck ring having interior threads.

4. The method of claim 3 which includes the further step of:

pressing the upper most portion of said tubular length of material into conformity with the threads of said neck ring to thereby form the finish portion of said plastic container.

5. The method of claim 4 wherein said pressing is carried out by a hollow core pin and wherein the step of conforming said tubular length of thermoplastic material to the interior contours of said preform mold includes the step of:

blowing said tubular length of material into contact with the interior contours of said preform mold by introduction of a gas under pressure through said hollow core pin into the interior of said tubular length of material.

6. The method of claim 5 which includes the further step of:

severing a moil portion from the upper portion of said tubular length of material by contact of said core pin with an exterior, tapered portion of said neck ring.

7. A process for the manufacture of hollow articles which comprises the steps of:

extruding a tubular length of a thermoplastic material;

moving an open preform mold from a first location remote from said tubular length of material to a second location surrounding said tubular length of material;

closing said preform mold around said tubular length of material;

grasping the upper portion of said tubular length of material with a tube retainer that is movable with said preform mold;

pressing a portion of said tubular length of material, located intermediate said tube retainer and said preform mold, into a generally uniform cylindrical portion by closing a support ring that is fixed in location at said second location;

severing said tubular length of material;

opening said support ring;

moving said preform mold, containing said severed tubular length of material, and said tube retainer to said first location for said preform mold;

grasping said generally uniform cylindrical portion at said first location with a neck ring having a defined internal contour;

conforming said tubular length of material to the interior contours of both said preform mold and said neck ring to thereby define a preform shape;

opening said preform mold and said tube retainer while keeping said neck ring closed;

indexing said preform shape carried by said neck ring to an open, conditioning mold;

closing said conditioning mold around said preform shape;

thermally conditioning said preform shape in said conditioning mold;

opening said conditioning mold;

indexing said preform shape carried by said neck ring to an open, final shape mold;

closing said final shape mold;

conforming said preform shape to the interior contours of said final shape mold to define a finished article;

opening said final shape mold;

indexing said finished article to a location over a moving removal conveyor; and releasing said finished article from said neck ring to allow removal by said conveyor.

8. The method of claim 7 wherein the step of conforming said preform shape to the interior contours of said final shape mold includes the steps of:

mechanically stretching said preform shape to thereby elongate its vertical dimension; and blowing said stretched preform shape into contact with the interior contours of said final shape mold by introduction of a gas under pressure into the interior of said stretched preform shape.

9. The method of claim 7 wherein said articles are plastic containers having an external threaded finish portion and wherein the step of conforming said tubular length of material to the interior contours of both said preform mold and said neck ring includes the step of:

pressing said generally uniform cylindrical portion into conformity with threads defining the interior contours of said neck ring to thereby form the finish portion of said plastic container.

10. The method of claim 9 wherein said pressing is carried out by a hollow core pin and wherein the step of conforming said tubular length of thermoplastic material to the interior contours of said preform mold includes the step of:

blowing said tubular length of material into contact with the interior contours of said preform mold by introduction of a gas under pressure through said hollow core pin into the interior of said tubular length of material.

11. The method of claim 10 which includes the further step of:

severing a moil portion from the upper portion of said tubular length of material by contact of said core pin with an exterior, tapered portion of said tube retainer.

* * * * *